(No Model.)

A. GORDON & D. DE GARMO.
MACHINE FOR CUTTING TOBACCO.

No. 397,544. Patented Feb. 12, 1889.

Attest.
M. E. Furlong.
Chas. F. Queen

Inventors.
Alex. Gordon, and
Danl. De Garmo,
By R. F. Osgood
Atty.

UNITED STATES PATENT OFFICE.

ALEXANDER GORDON AND DANIEL DE GARMO, OF ROCHESTER, NEW YORK.

MACHINE FOR CUTTING TOBACCO.

SPECIFICATION forming part of Letters Patent No. 397,544, dated February 12, 1889.

Application filed May 11, 1885. Serial No. 165,055. (No model.)

*To all whom it may concern:*

Be it known that we, ALEXANDER GORDON and DANIEL DE GARMO, both of Rochester, Monroe county, New York, have invented a certain new and useful Improvement in Machines for Cutting Tobacco; and we do hereby declare that the following is a full, clear, and exact description of the same, reference being had to the accompanying drawings, in which—

Figure 1:
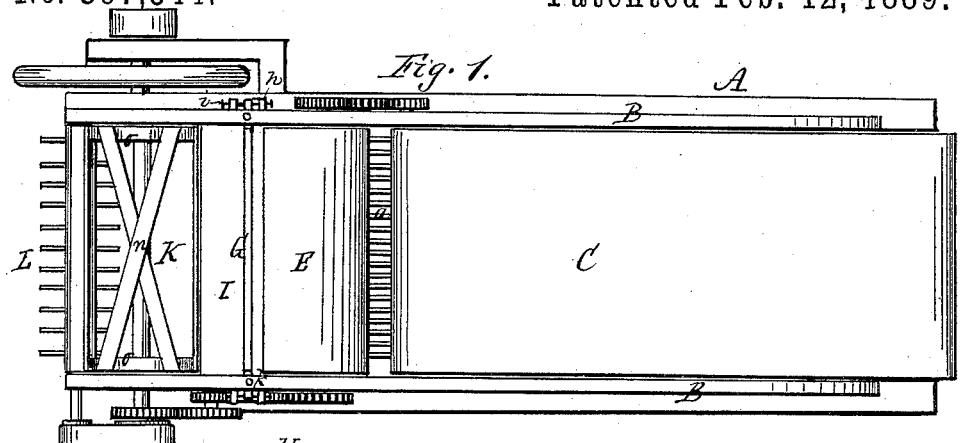
Figure 2:
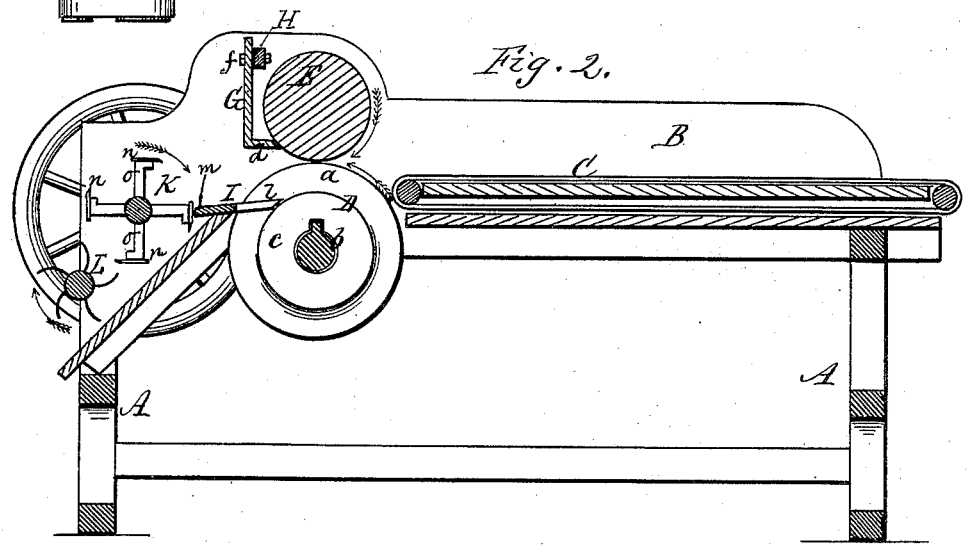
Figure 3:
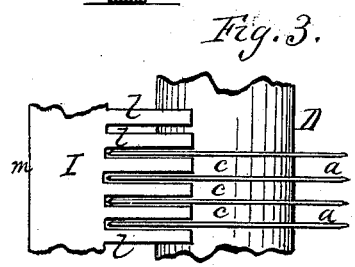
Figure 4:
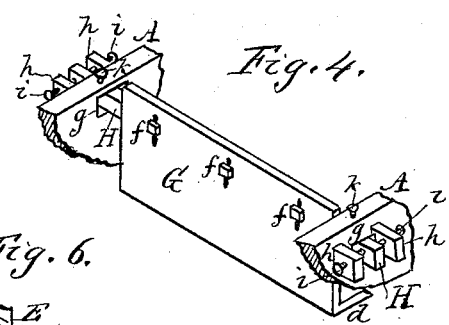
Figure 5:
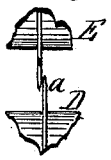
Figure 6:
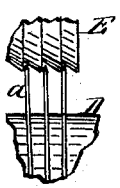

Figure 1 is a plan of a machine, showing our improvement. Fig. 2 is a longitudinal vertical section of the same. Fig. 3 is a diagram showing a plan view on an enlarged scale of the cutter and guide-plate. Fig. 4 is a perspective view of the adjustable compressing-plate and its attachments. Figs. 5 and 6 are elevations showing modifications of the cutting devices.

Our improvement relates to machines for cutting tobacco in fine form for cigar-fillings. To do this, it is necessary to first cut the tobacco longitudinally or in the direction of its length into shreds and then cross-cutting it into small squares or pieces.

Our invention consists in the combination of parts for doing this work, as hereinafter more fully described and definitely claimed.

In the drawings, A shows the frame, which may be of any desired form.

B is a cutting box or hopper similar to that of a feed-cutter.

C is an endless carrier for feeding the leaf-tobacco forward to the cutters. This carrier may or may not be used at pleasure, as the tobacco can be fed forward without it.

D is the cutter for cutting the tobacco longitudinally into shreds, and E is a gage-roller above it for holding the tobacco down to the cutter. The cutter consists of a series of circular knives, *a a*, placed at proper distance apart on a shaft, *b*, with washers *c c* between. The knives and washers are notched and fit on a feather of the shaft, by which they are made to turn with the shaft, resting against a shoulder at one end of the shaft, and clamped up by a nut at the other end. By this means the knives can be removed and replaced at any time, which is necessary in repairing broken parts or for sharpening. The edges of the knives run close to the gage-roller, so as to cut through the tobacco. Instead of this form the gage-roller may also have knives, as shown in Fig. 5, and the edges of the two sets of knives may cut past each other, or the gage-roller may have a series of shoulders, against which the knives cut, as shown in Fig. 6. Other forms may also be used with the same result. Springs may rest above the boxes of the gage-roller, so that the roller will yield if any hard object passes through.

G is a guide-plate standing vertically in front of the gage-roller and provided with a right-angled flange, *d*, at its bottom, which extends inward horizontally, resting against the periphery of the roller at such a distance above the cutters as will continue the throat of the machine through which the tobacco passes some distance forward of the cutter, as shown in Fig. 1. This plate is attached to a cross-bar, H, by means of bolts *f f*, which pass through vertical slots of the plate, by which means the plate can be adjusted higher or lower to increase or lessen the size of the throat. The ends of the bar H pass out through slots or openings *g g* in the sides of the box or hopper, which openings are wider than the bar, so that the bar can be adjusted forward or back, carrying the plate G with it.

*h h* are lugs on the outside of the box or hopper, between which the projecting ends of the bar rest; and *i i* are set-screws which pass through these lugs and rest against the bar. By this means the bar can be adjusted forward or backward and held at any adjustment. *k k* are set-screws that pass down vertically through the box and bear upon the bar to clamp it fast. This forward and backward adjustment of the bar is essential to accommodate the vertical adjustment of the plate under the convex sides of the roller.

I is a guide-plate which stands forward of the cutter D and at such an angle thereto as to run the tobacco off to the cross-cutter. It is slitted, forming fingers or bars *l l*, that reach in between the circular knives and rest against the washers, while the knives themselves run in the slits. The tobacco after it is slitted passes off over the fingers *l l* to the outer edge of the guide-plate I, which serves as a stationary cutting-edge where the tobacco is cross-cut by a cross-cutter.

K is the cross-cutter, the same consisting of knives *n n*, set spirally on cutter-heads *o o*, and having a revolving motion. Said knives cut crosswise past the shear-edge of the plate I and cut the slitted tobacco into small squares or pieces, suitable for cigar-fillings.

The guide-plate G serves the important purpose of extending the throat outward beyond the longitudinal knives, thereby holding the tobacco compressed and in its packed form till it is reached by the cross-cutters. If it were not used, the tobacco would expand as soon as it passed the longitudinal knives and the cross-cutters could not act upon it properly.

L is a picker located forward and below the cross-cutter, and serving to break up and loosen the tobacco as it comes from the machine. It consists of a cross-shaft, to which are attached curved arms or spikes, as shown. It is not necessary to use the picker in all kinds of tobacco, but it is of service in some kinds, especially when very damp and heavy.

The various operating parts may be driven by any desired kind of gears or belt-work.

If desired, the knives in the cross-cutter K, instead of being spiral, as described, may be made straight. Any other form of cutter that will cut crosswise may be used—for instance, a wheel like a balance-wheel armed with knives that will produce a shearing-cut like a well-known form of straw-cutters.

The guide-plate I has, or may have, near its cutting-edge *m* a transverse rib projecting from its surface to strengthen and stiffen the same, as shown in Figs. 2 and 3.

Having described our invention, what we claim as new, and desire to secure by Letters Patent, is—

The combination, with the roller E and rotary cutter D, of the slotted guide-plate G, provided with a flange, *d*, the bar H, to which the guide-plate is adjustably attached by bolts, the hopper having elongated slots *g g*, the lugs *h h*, between which the ends of the bar rest, and the set-screws *i k* in the lugs and hopper for adjusting the bar longitudinally of the machine, as set forth.

In witness whereof we have hereunto signed our names in the presence of two subscribing witnesses.

ALEXANDER GORDON.
DANIEL DE GARMO.

Witnesses:
R. F. OSGOOD,
P. A. COSTICH.